INVENTOR
HANS H. NIEDIEK

United States Patent Office 3,341,848
Patented Sept. 12, 1967

3,341,848
METHOD FOR THE COUNTING OF VEHICLES THE SPEED OF WHICH EITHER EXCEEDS OR FALLS SHORT OF A PREDETERMINED VALUE
Hans H. Niediek, Stuttgart-Zuffenhausen, Germany, assignor to International Standard Electric Corporation, New York, N.Y., a corporation of Delaware
Filed Sept. 20, 1965, Ser. No. 488,410
Claims priority, application Germany, Oct. 24, 1964, St 22,853
5 Claims. (Cl. 343—8)

ABSTRACT OF THE DISCLOSURE

Apparatus to provide for the counting of vehicles passing through a radar or ultrasonic beam, the rate of speed of which either exceeds or falls short of a predetermined limit.

Road traffic in Germany calls to an increasing extent for a controlling of light signalling systems in accordance with traffic requirements. Traffic evaluators which are still in the stage of development, are not only supposed to assess the number of vehicles but, in addition thereto, also the speed of the vehicles. For assessing the vehicular speeds there are substantially employed two methods. In one of these two road contact sills are arranged directly behind each other, and there is evaluated the timely distance between two pulses resulting from the vehicle passing over the sills. This method, however, has proved unreliable especially in winter.

The second of these methods employs ultrasonic or radar apparatus which, whenever a vehicle passes through a directed and focussed (bundled) beam, produce a Doppler frequency. Upon rectification of the Doppler frequency by using timing circuits for eliminating disturbing influences, there is produced the vehicle pulse which may be further processed as a counting pulse in the course of the evaluation.

The present invention relates to a method for the counting of vehicles the speed of which either exceeds or falls short of a predetermined limit value, in which ultrasonic or high-frequency radar equipments are used for ascertaining the driving speed of the vehicles assessed by these equipments.

Since, however, a steadily increasing number of radar or ultrasonic equipments are connected to one evaluating arrangement, every information must be kept as short as possible for reasons of transmission. It, therefore, appears to be inappropriate to transmit the vehicular pulse, existing as long as a vehicle moves within the radar beam, with its full length. Likewise, also the Doppler frequency should not be transmitted for the purpose of assessing the speed.

Accordingly, the present invention is based on the problem of providing a method for the counting of vehicles, the speed of which either exceeds or falls short of a predetermined limit value, and which are assessed with the aid of an ultrasonic or radar equipment transmitting for every vehicle passing through the measuring or metering beam, one electrical pulse which, on account of the Doppler frequency, simultaneously also contains an information relating to the travelling speed of the passing vehicle.

The problem is solved by the present invention in that this vehicular pulse, in dependence upon the information contained therein relating to the rate of speed of the vehicle to which the pulse is assigned, is fed in such a way to an evaluating or recording equipment that the signal which is conducted via the one of two lines extending to the recording or evaluating equipment, contains an information regarding the passing vehicle, and that a signal is transmitted over the other line if the speed of the passing vehicle either exceeds or falls short of a predetermined limit value.

According to another solution to the problem on which the present invention is based this, vehicular pulse, in dependence upon the information contained therein relating to the rate of speed of the passing vehicle to which the pulse is assigned, is fed in such a way to an evaluating or recording equipment via two separate lines, that a signal is transmitted over the one line if the rate of speed of the passing vehicle falls short of a predetermined limit value, and that a signal is transmitted over the other line if the rate of speed of the passing vehicle exceeds the same predetermined limit value.

In further embodying the invention the vehicular pulses, in dependence upon the information contained therein relating to the rate of speed of the respective vehicle, and providing this rate of speed exceeds a predetermined limit value, serves to open or unblock a gating circuit, and the vehicular pulses are used to unblock or open another gating circuit in cases where the rate of speed of the passing vehicle falls short of the predetermined limit value.

In still further embodying the invention the duration of the speed pulses and that of the counting pulses corresponds to the limit drawn by the limit frequency of the transmission path.

According to a further embodiment of the invention both the speed and the counting pulses are composed of one positive and one negative half-wave.

The method according to the invention will now be explained in detail with reference to an example of embodiment shown in FIGS. 1 to 3 of the accompanying drawings, in which.

Figure 3:
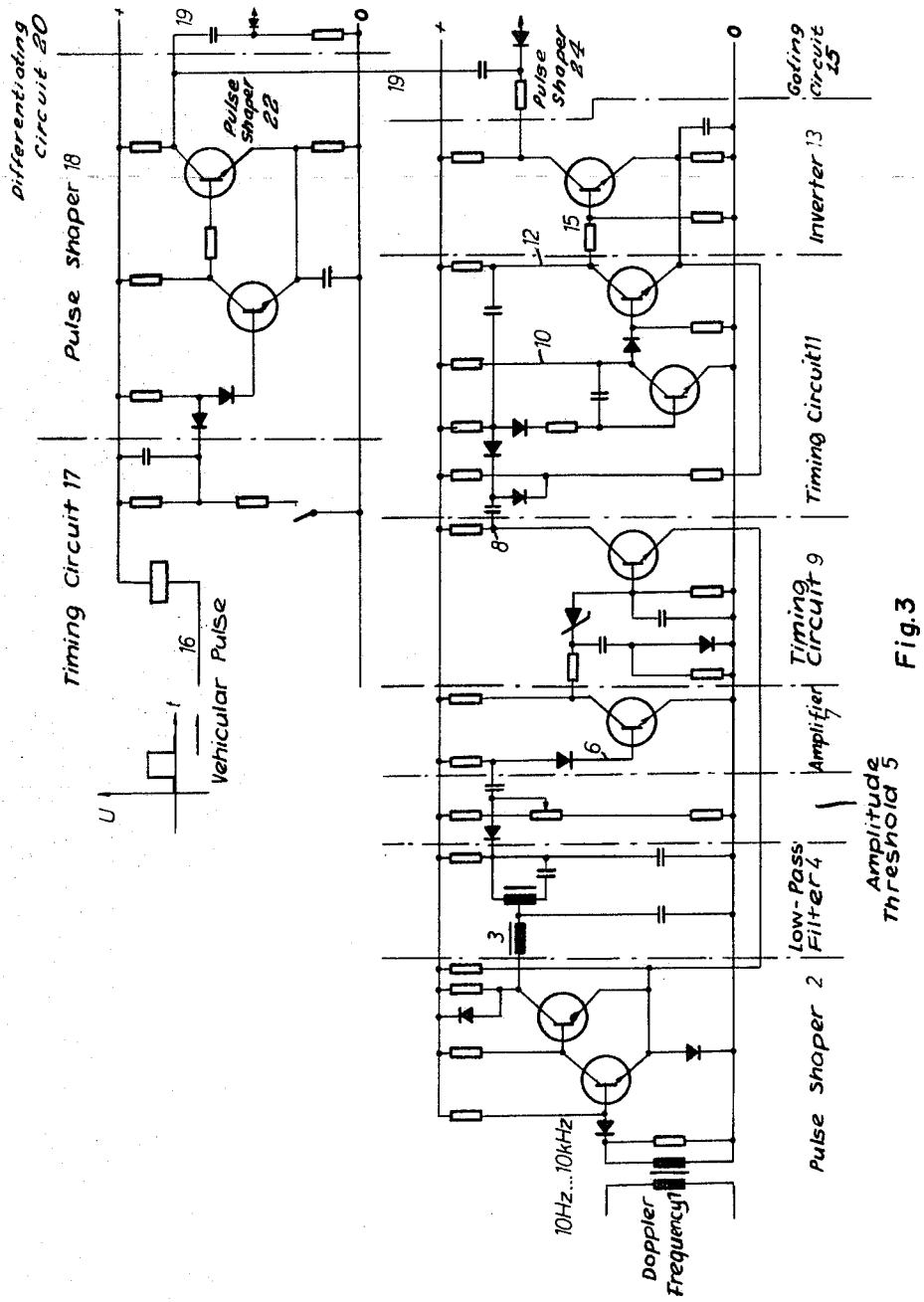

FIG. 3 finally shows an exemplified circuit arrangement in a more detailed representation, with the aid of which the method according to the invention may be carried out.

Figure 1:
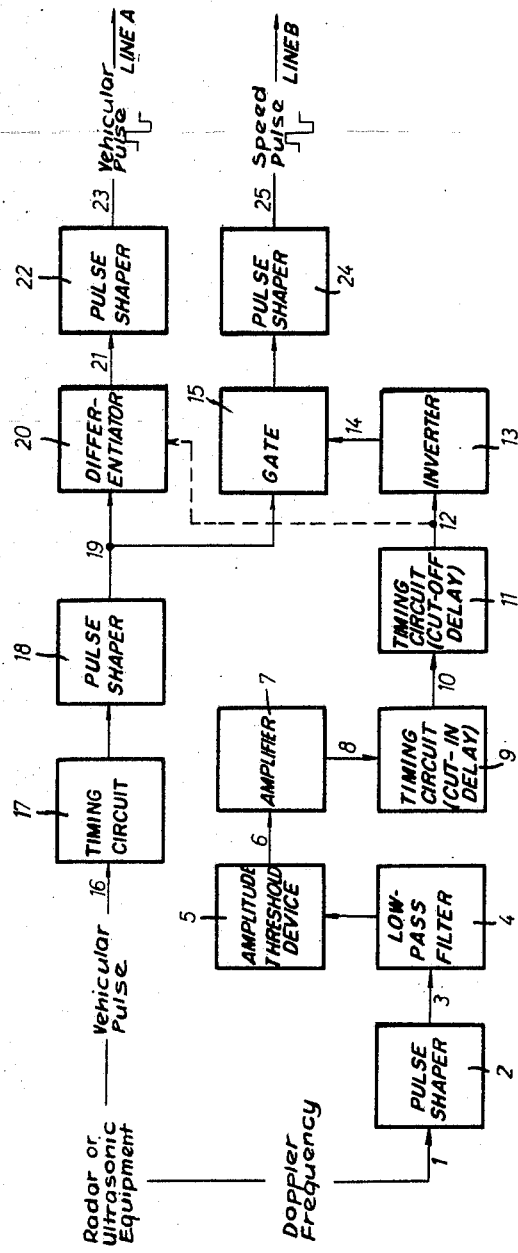
FIG. 1 shows a complete block diagrams of an arrangement for carrying out the method according to the invention.

The Doppler frequency 1 in FIG. 1 arriving with an irregular amplitude from a radar or ultrasonic equipment, is applied to a pulse shaper 2. In this stage 2 the Doppler frequency is converted into discrete rectangular pulses 3 with a defined amplitude, and feeds these converted pulses 3 to a low-pass filter 4 via which they are fed to an amplitude threshold 5 which only permits the passage of those trains of pulses 6 lying below a predetermined limit frequency. A subsequently arranged amplifier stage 7 amplifies the pulses 6 to the necessary voltage value, and feeds the thus amplified pulses 8 to a timing circuit 9 effecting a cut-in delay. It suppresses the first pulses of the train of pulses and only permits the passage of the subsequently following pulses 10; in this way there is avoided an unwanted effect of individual possibly appearing interference pulses. The train of pulses 10 is then applied to a further timing circuit 11 effecting a cut-off delay, and thereby bridges the pulse intervals, so that as the output of this timing circuit there is transmitted a continuous pulse 12 which is applied to an inverter 13.

This inverter serves to invert the polarity of the input pulse 12 in such a way that the output pulse 14 as transmitted thereby, will block the subsequently arranged gating circuit 15 for the time of the pulse 14. The vehicular pulse 16 appears simultaneously with the Doppler frequency 1 and is applied to a timing circuit 17 which, after a certain delay period, transfers it to a pulse shaper 18. In this pulse shaper the pulse 19 is provided with the necessary steepness of edges, and is amplified to the necessary value in order to control the subsequently arranged differentiating circuit 20 and the gating circuit 15. The timing circuit 17, by providing a correspondingly dimensioned delay, takes care that the vehicular pulse will only be applied to the gating circuit 15 when the latter, by the blocking pulse 14 as released by the Doppler frequency, has been reliably blocked. After the pulse 19 has been passed through the differentiating circuit 20, the differentiated pulse 21 will actuate the pulse shaper 22 which constitutes a pulse 23 which is of such suitable shape as to be transmitted over lines. The vehicular pulse 19, however, can only pass through the gating circuit 15 if the Doppler frequency is higher than the given limit frequency. Only in this case the pulse shaper 24 which is arranged subsequently to the gating circuit 15, will form in a similar way as the pulse shaper 22, a speed pulse 25 which is suitable for being transmitted over lines. Accordingly, it is accomplished by this circuit arrangement that each vehicle passing through the radar or ultrasonic beam, will effect the forming of a counting pulse 23 for transmission of the latter on the line A, whereas the additional speed pulse 25 is only available for transmission over the line B if the Doppler frequency corresponding to the rate of speed of the respective vehicle is higher than a previously determined rate of speed value.

If, however, the continuous pulse 12 is used for controlling the differentiating circuit 20 designed as a gating circuit, then a pulse will only appear on the line A if the vehicle covered by the radar equipment, is driving slower than at the predetermined speed. Vehicles moving faster than stated by the speed value, will cause the transmission of a pulse on line B only.

Figure 2:
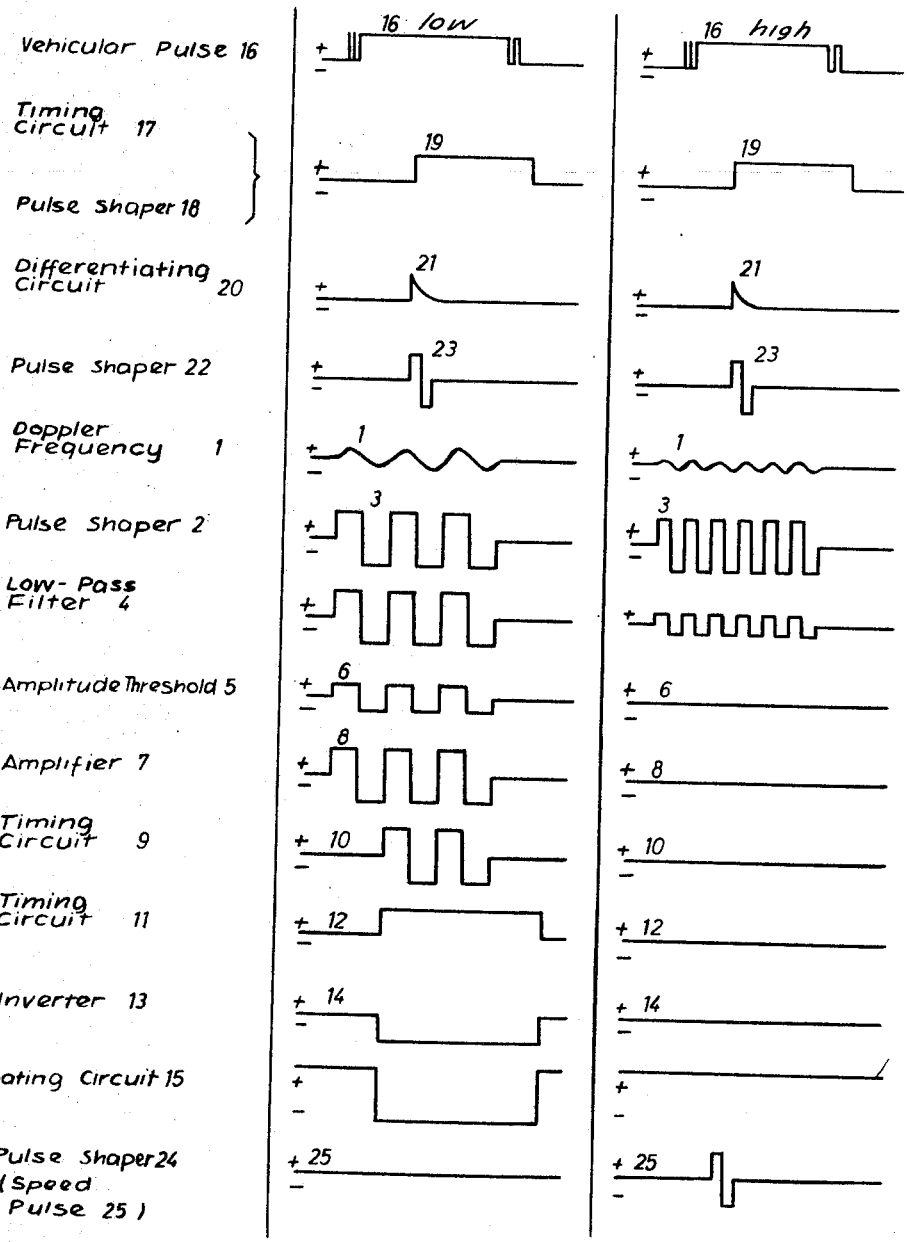
FIG. 2 shows the pulse diagram relating to the resulting speed and counting pulses.

In the pulse diagram according to FIG. 2 the corresponding pulse shapers are shown under the references relating to FIG. 1.

FIG. 3 shows an example of embodiment relating to a circuit arrangement capable of providing the pulse program as described hereinbefore, and capable of causing the described effect; also in this drawing the references are in agreement with those of FIG. 1, so that a further explanation regarding the function is considered superfluous.

The substantial function of the described circuit arrangement on which the present invention is based, namely of forming a vehicular pulse 16 for every vehicle passing through the radar or ultrasonic beam, and of simultaneously forming a speed pulse 25 dependent upon the Doppler frequency 1 in the case of those vehicles travelling at speeds higher than the given rate of speed, may, of course, also be achieved with the aid of other means. Thus, for example, it would be possible to evaluate the Doppler frequency necessary for evaluating the travelling speed of the passing vehicles, by providing a special circuit portion, directly in the radar equipment itself, and to feed the information to a further relay transmitting a continuous pulse in dependence upon the travelling speed and, consequently, upon the Doppler frequency in the case of vehicles moving either too slow or too fast.

The respective circuit condition of the relay may continue to exist after the dying out of the Doppler frequency. This relay, however, must have operated before the other relay operates which transmits the vehicular pulse, and it may only change its state or condition after the relay for the vehicular pulse has already dropped off. In other words, this means that the relay for the speed evaluation is actuated first, and only thereafter the relay for the vehicular pulse, and that the armature of the first mentioned relay will have to remain unmoved in its attracted position as long as the contact of the other relay for the vehicular pulse is closed.

The relay serving the speed evaluation should be provided with a switchover (two-way) contact capable of being connected in series with the closing contact of the relay for the vehicular pulse. If the series connection is effected with the closure side of the two-way or switchover contact, then it is possible to form thereby a second pulse which may be used for recording (indicating) such vehicles moving at a speed slower than the predetermined rate; however, if the closing contact of the relay for the vehicular pulse is connected in series with the opening side of the switchover contact then the pulse formed in this way, may be used for evaluating vehicles travelling at a speed higher than the given limit value.

These pulses, as already described hereinbefore, may also be reshaped with the aid of subsequently arranged pulse shapers, in such a way as to become suitable for being further transmitted over transmission paths customary in the telecommunications art.

What is claimed is:

1. Apparatus for the counting of vehicles, the speed of which either exceeds or falls short of a predetermined value, comprising:
 a source of vehicular pulses, one pulse for every vehicle passing through a radar or ultrasonic beam;
 means responsive the Doppler frequency of said pulses including,
  a first pulse shaper to convert the Doppler frequency into a train of discrete rectangular pulses with a defined amplitude,
  filter means coupled between said first shaper and an amplitude threshold device which permits the passage of said rectangular pulses lying below a predetermined limit frequency,
  first timing circuit means for converting said rectangular pulses into a continuous pulse which is applied to an inverter, and
  a gating circuit coupled to the output of said inverter, whereby said gating circuit is blocked for the time of said continuous pulses;
 second timing circuit means responsive to said vehicular pulses which, after a certain delay period transfers said pulses to a second pulse shaper, said second pulse shaper coupled to a subsequently arranged differentiating circuit and said gating circuit;
 a third pulse shaper coupled to said differentiating circuit for producing the counting pulse output; and
 a fourth pulse shaper coupled to said gating circuit, to produce speed pulses, whereby vehicular pulses can only pass through said gating circuit to produce said speed pulses if said Doppler frequency is higher than said limit frequency.

2. Apparatus according to claim 1, further including an amplifier stage for amplifying said rectangular pulses to a required voltage value.

3. Apparatus according to claim 2, wherein said first timing circuit means comprises:
 a cut-in delay timing circuit coupled to said amplifier stage for suppressing the first pulses of said train of pulses and permitting the passage of the subsequently folowing pulses;
 a cut-off delay circuit for bridging the pulse intervals of the subsequently following pulses to produce said continuous pulse; and
 said inverter serves to invert the polarity of said continuous pulse, whereby said gating circuit is blocked for the time of said continuous pulse.

4. Vehicular counting apparatus comprising:
 a source of vehicular pulses, one pulse for every vehicle passing through a radar or ultrasonic beam;
 means responsive to the Doppler frequency shift of said pulse including,
  a first pulse shaper to convert the Dopple frequency shift into a train of discrete rectangular pulses have a defined amplitude,
  a low pass filter coupled between said first shaper and an amplitude threshold device, said device to permit the passage of said rectangular pulses lying below a predetermined limit, an amplifier stage coupled to said device for amplifying said rectangular pulse to a required voltage value, a cut-in delay timing circuit coupled to said amplifier for suppressing the first pulse of said train of pulses and permitting the passage of the subsequently following pulses, a cut-off delay circuit for bridging the pulse intervals of the subsequently following pulses to produce a continuous pulse, an inverter serving to invert the polarity of said continuous pulses, and a gating circuit coupled to the output of said inverter, whereby said gating circuit is blocked for the time period of said continuous pulses;

timing circuit means responsive to said vehicular pulses which, after a certain delay period, transfers said pulses to a second pulse shaper, said second shaper coupled to a subsequently arranged differentiating circuit and said gating circuit;

a third pulse shaper coupled to said differentiating circuit for producing the output counting pulses; and a fourth pulse shaper coupled to said gating circuit, to produce the output speed pulses, whereby said vehicular pulses can only pass through said gating circuit to produce said speed pulses if said Doppler frequency shift is higher than said predetermined limit frequency.

5. Apparatus according to claim 4, wherein said differentiating circuit is designed as another gating circuit having said continuous pulse as an additonal input, such that said counting pulses are only produced when the vehicle is moving slower than the predetermined limit.

References Cited

UNITED STATES PATENTS

| | | | |
|---|---|---|---|
| 3,059,232 | 10/1962 | Barker | 343—8 |
| 3,082,949 | 3/1963 | Barker | 235—150.24 |
| 3,182,312 | 5/1965 | Daniels | 343—8 X |
| 3,195,126 | 7/1965 | Barker | 343—8 X |
| 3,233,212 | 2/1966 | Auer et al. | 343—8 X |

RODNEY D. BENNETT, *Primary Examiner.*

C. L. WHITHAM, *Assistant Examiner.*